UNITED STATES PATENT OFFICE.

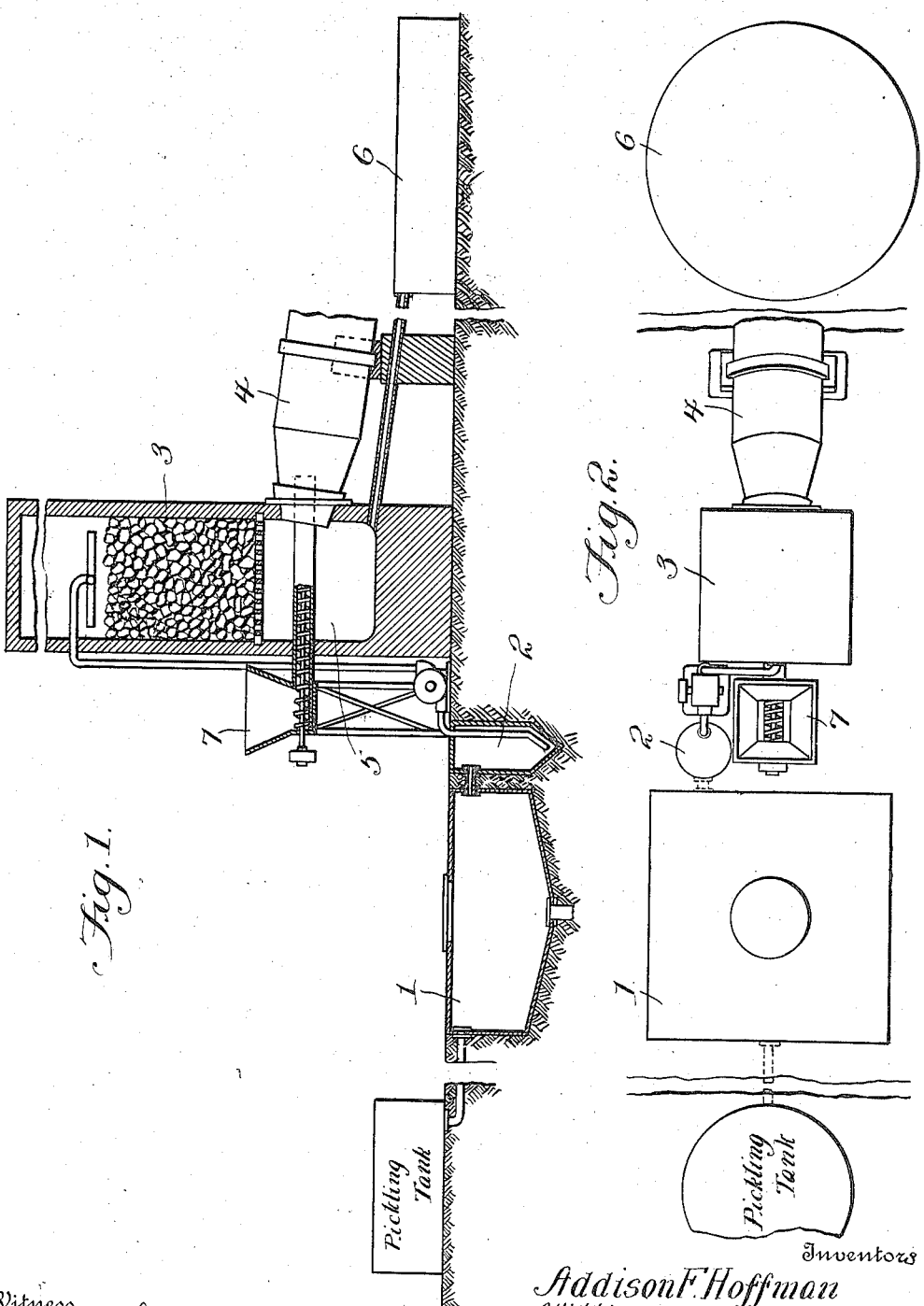

ADDISON F. HOFFMAN AND WILLIAM METCALF PARKIN, OF PITTSBURGH, PENNSYLVANIA.

METHOD OF TREATING WASTE PICKLE LIQUOR.

1,269,441.  Specification of Letters Patent.  Patented June 11, 1918.

Application filed April 8, 1916, Serial No. 89,932. Renewed November 10, 1917. Serial No. 201,399.

*To all whom it may concern:*

Be it known that we, ADDISON F. HOFFMAN and WILLIAM METCALF PARKIN, citizens of the United States, residing at Pittsburgh, in the county of Allegheny and State of Pennsylvania, have invented new and useful Improvements in Method of Treating Waste Pickle Liquor, of which the following is a specification.

This invention relates to a process of treating waste pickle liquor produced as a by product in pickling iron articles in an acid solution containing sulfuric acid.

The solution of sulfuric acid and water used in cleaning of pickling metals at industrial plants is usually strengthened from time to time by the addition of acid and its use is continued until it shows a density of about 22° Bé., when it is generally discarded. To continue the solution in use longer would so increase the density of the solution that the crystals of ferrous sulfate ($FeSO_4.7H_2O$) might form on the surface of the metal which is being cleaned.

Our aim is to use the solution as long as is practical, at or near the boiling point, so that the subsequent evaporation of excess water (in producing ferrous sulfate crystals or copperas) will be small.

The accompanying drawings show, somewhat diagrammatically, an apparatus suitable for use in carrying out our process. In said drawings:—

Figure 1 is an elevation, partly in section of such an apparatus, and Fig. 2 is a plan view thereof.

In carrying out our invention the spent or waste pickle liquor is permitted to flow (or is pumped) from the pickling tanks, (which may be situated at various points in the mill and usually connected with the mill sewer) to a settling tank 1, conveniently located but preferably underground and covered so that it will not take up needed and valuable yard room, and also so that it will preserve the heat in order to economize fuel in the subsequent evaporation of the liquor. Insoluble matter settles in this tank and for this reason a sewer connection is provided for the purpose of cleaning it at intervals. The free acid which in practice is usually present to an extent of about 100 pounds to every 750 gallons is not neutralized. 2 is a relatively small sump tank into which the clear liquor flows from the tank or tanks 1. Adjacent to the sump tank is a concentrator 3, which may consist of a stack or tower containing a refractory filling material as for example some suitable silicious rock or other inert filler over which the waste pickle may be caused to flow. A furnace 4 is shown as connected to the stack and this furnace may be of any suitable form for example an ordinary rotary type now found upon the market. The hot gases rising through the interstices of the filler 3 causes evaporation of the surplus water in the waste pickle liquor as it flows over the filler. Below the filler is a basin 5. The flow of the liquor over the filler of the concentrator is so regulated that the concentrated liquor may collect in the basin 5 at a density of about 35 or 36° Bé. and at a temperature of 90° C. (the density being measured hot).

From the basin 5 the concentrated solution containing ferrous sulfate, ferric sulfate and sulfuric acid flows into the crystallizing tanks 6, where it is permitted to cool and deposit ferrous sulfate crystals on wooden rods or racks suspended in these tanks. If desired evaporation may be accelerated in the concentrator by attaching a blower thereto.

The mother liquor that is the liquor after crystallization has taken place, still contains some ferrous and ferric sulfates, and considerable free sulfuric acid, is then returned to the pickling tanks, where it may be mixed with water and acid and reused in cleaning metals.

The recovered copperas is a commercial article, but it is the intention to use it in a later stage of this process. Any ferric sulfate present is permitted to remain in the mother liquor as it is of advantage in the pickling operation.

After the ferrous sulfate crystals are drained, they are crushed to powder and allowed to oxidize in moist air, although this action may be accelerated by blowing air, either hot or cold, through the mass. The reaction is as follows:

$$3FeSO_4 + O + H_2O = Fe_2(SO_4)_3.Fe(OH)_2.$$

This salt takes up more oxygen and water, being converted into $Fe_2(SO_4)_3.Fe(OH)_3$. This basic ferric sulfate is also a salable product, but we prefer to convert this into pigment, by heating in furnace 4.

We have found that if this basic ferric sulfate be heated in contact with water or water vapor, it will break up into sulfuric acid and ferric hydrate. As the temperature increases (between 179 and 338° C.), sulfuric acid and water distil from the material, leaving ferric oxid. The chemical equations are approximately as follows:

$$Fe_2(SO_4)_3 \cdot Fe(OH)_3 + 6H_2O = 3H_2SO_4 + 3Fe(OH)_3$$

and $$2Fe(OH)_3 = Fe_2O_3 + 3H_2O.$$

Should there not be sufficient water present the temperature required would be considerably higher and the decomposition equation would be:

$$2[Fe_2(SO_4)_3 \cdot Fe(OH)_3] = 3Fe_2O_3 + 3H_2SO_4 + 3SO_3.$$

(Part of the $SO_3$ would also be decomposed into $SO_2$ and $O$.)

Any kind of fuel may be used, for example oil, coke, natural or producer gas or pulverized coal, but care should be taken that there will be as little smoke produced as is possible.

The vapors and hot gases given off during this heating step are then passed from the furnace 4 to and through the filled tower 3, through which the cleaned liquor is flowing, the acid there being absorbed, while water is evaporated from the liquor. In practising our invention, we have recovered as much as 95% of the total $SO_3$ content of the waste pickle liquor, both the $H_2SO_4$ vapor and the $SO_3$ fumes being absorbed in the tower 3.

Should the crystals not be completely changed to basic ferric sulfate before calcination the reaction would partly be $2FeSO_4 = Fe_2O_3 + SO_2 + SO_3$ and a part of the acid radical in the crystals would be lost.

It is evident that the acid vapors can be handled differently than by the mode above described and strong acid produced instead of absorbing the acid vapors in the waste pickle liquor.

Any means may be employed for feeding the basic ferric sulfate to the furnace, but for convenience of illustration we have shown a hopper 7 for this purpose. The ferric oxid discharged from the lower end of the kiln is suitable for use as pigment or as rouge.

If desired a pyrometer may be used on or in the kiln to indicate the temperature, and the kiln temperature will be regulated according to the pyrometer readings.

It will be noted that the temperatures necessary in the heating step is materially lower than the temperatures heretofore used in the calcination of ferrous sulfate. The resulting pigment is also of a much better quality than that produced by the calcination of ferrous sulfate.

By calcining the basic ferric sulfate, and concentrating the waste pickle liquor by the waste heat of said operation, it will be seen that the mother liquor will be suitable for pickling, as very little of the acid will be lost, the vaporizing point of the acid being much higher than that of the water which is removed from the liquor in the condenser 3.

Theoretically one ton of sulfuric acid of 66° Bé., used to exhaustion in cleaning iron or steel would contain sufficient ferrous sulfate to produce 1520 lbs. of ferric oxid. In actual practice the acid of the pickle liquor is not completely exhausted, so that a smaller quantity is recovered. The recovered acid is of considerable value, in some cases entirely paying for the treatment.

In a modification of the process, the temperature of the furnace can be maintained at such a point that the oxids will nodulize and the same can then be used as an iron ore.

Where the product is to be used as pigment a small quantity of salt (NaCl) may be added to the sulfate before calcination to aid in the complete elimination of sulfur, but this applies only when calcination is used, i. e., when heated to much higher temperatures than above specified. Where the temperature of treatment is lower than required to decompose all the sulfate or basic sulfate, the product should be bolted and washed with an alkaline solution to eliminate traces of sulfur.

Instead of concentrating the waste pickle liquor by heat furnished by the furnace 4, heat from a separate furnace may be used or there may be a plurality of concentrators 3, evaporating the surplus moisture from the waste pickle liquor. The enriched waste pickle liquor from the concentrator may be distributed among several tanks or the mother liquor from several tanks may be transferred to a storage tank where a more uniform liquor will result which may be run into the pickling tanks as wanted.

Instead of oxidizing the copperas, or ferrous sulfate, there may be certain conditions where it may be preferable to calcine the ferrous sulfate, thereby losing about one half of the sulfate radical and recovering ferric oxid, wasting the sulfur dioxid or collecting it for use in making some other product, for example calcium sulfite.

Any suitable form of apparatus may be employed to carry out our invention, the details of parts herein described being only illustrative of one means for practising the invention.

What we claim is:

1. The method of treating sulfuric acid waste pickle liquor for the recovery of sulfuric acid and ferric oxid, which consists in collecting the waste pickle liquor and removing extraneous matter therefrom, then recovering the ferrous sulfate in the form of crystals, pulverizing the crystals and oxidizing the same, then subjecting the product to the action of heat to drive off sulfuric acid and water producing ferric oxid and collecting the ferric oxid and sulfuric acid.

2. The method of treating sulfuric acid waste pickle liquor for the recovery of sulfuric acid and ferric oxid, which consists in collecting the waste pickle liquor and recovering the ferrous sulfate in the form of crystals, oxidizing the ferrous sulfate, heating the product of such treatment while agitating the same, to a temperature sufficient to drive off the acid radical and water, producing ferric oxid and collecting the sulfuric acid and ferric oxid.

3. The method of treating sulfuric acid waste pickle liquor which consists in removing from the solution insoluble matter by sedimentation, concentrating the waste pickle liquor, crystallizing out ferrous sulfate, crushing and oxidizing the crystals thereby changing ferrous sulfate to ferric sulfate, subjecting the ferric sulfate to the action of heat sufficient to produce ferric oxid, absorbing the vapors from the said heating operation in waste pickle liquor and returning the acid mother liquor from the crystallization step to the metal pickling operation.

4. The herein described process of treating waste sulfuric acid pickle liquor, which comprises settling out a material proportion of the insoluble impurities, and thereafter without neutralization of the free acid or reduction of the ferric compounds therein, concentrating the relatively clear liquor by subjecting flowing currents thereof to the action of a gas current containing acid-forming vapors, crystallizing out a material quantity of the ferrous sulfate content, oxidizing the ferrous sulfate and subjecting the oxidized product to heat in the presence of steam, at a temperature between 179 and 338° C.

In testimony whereof we affix our signatures in presence of two witnesses.

ADDISON F. HOFFMAN.
WILLIAM METCALF PARKIN.

Witnesses:
B. F. HOFFACKER,
S. SELLERS.